G. W. CHIPMAN.
Stair-Carpet Pad.
No. 8,116. Reissued March 12, 1878.
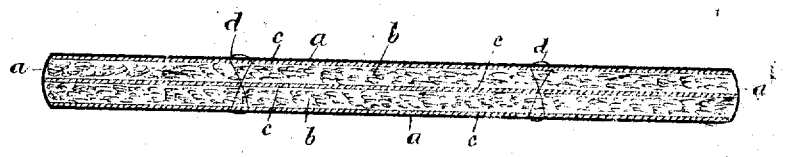
Witnesses.
W. J. Pratt.
A. L. Mudge
Inventor.
Geo. W. Chipman
by Crosby & Gregory Attys

UNITED STATES PATENT OFFICE.

GEORGE W. CHIPMAN, OF BOSTON, MASSACHUSETTS.

IMPROVEMENT IN STAIR-CARPET PADS.

Specification forming part of Letters Patent No. 53,573, dated April 3, 1866; Reissue No. 8,116, dated March 12, 1878; application filed December 19, 1877.

*To all whom it may concern:*

Be it known that I, GEORGE W. CHIPMAN, of Boston, in the county of Suffolk and State of Massachusetts, have invented an Improved Stair-Carpet Pad; and I do hereby declare that the following, taken in connection with the drawings which accompany and form part of this specification, is a description of my invention sufficient to enable those skilled in the art to practice it.

The tread of persons in traveling over flights of stairs differs from the tread of the same persons when walking upon a level, the foot descending with a forward thrust or push, which brings a peculiar wear upon the carpet of the stairs, and calls for a pad or cushion under the carpet which will resist the thrusting or pushing action of the foot.

Where mere layers of soft material are placed beneath the stair-carpet on the treads of the staircase, they are soon displaced or pushed from the front edge of the tread of each stair, and are apt to become ridgy, leaving the carpet without a yielding wear-saving cushion at the point of greatest wear—the edge of the stair-tread.

To obviate the objections named, and to produce a stair-carpet pad which will not become ridgy, and which is impervious to moths and dust, is the object of my invention.

Said invention is embodied in a pad large enough to cover that surface of a stair-tread which is overlaid by a carpet, when prepared as an article of manufacture, fit to be sold in any quantity, and ready to be applied without cutting or fitting. It is constructed of one or more composite layers enveloped in a closed case of textile material, this and the layer or layers inclosed being united by quilting or sewing through the whole material, and the layer or layers, consisting of sheets of felt or batting or other fibrous matter, covered on each side with sheets of paper.

The drawing represents, in cross-section, my improved stair-carpet pad, it being shown as having two layers of fibrous material, *b*, layers of paper *c*, and strengthening-layers of textile material *a*.

The quilting or stitches by which the central parts of the underlay or pad are held together are shown at *d d*.

Without the employment of the paper the pad would be too flexible, and the layers *a* of soft fibrous material, adhering to the textile cover or strengthening-layer, would be displaced by the thrusts received in wear, and would soon become ridgy. The strengthening-layer, co-operating with the paper at the place where the stitches are made, enables the stitches to be held more securely than would be the case were the layer *a* omitted. The stitches easily cut into and tear through the paper *c*; but when the textile layer *a* is added, the stitches have an extra layer into which to hold, making them less liable to cut and injure the paper of the pad.

Upon removal of a stair-carpet, these pads beneath it may be taken up and cleaned by beating, and can be relaid with a change of position.

The strengthening-layer *a* rests upon and contiguous to the layer of paper.

I claim—

1. As a new article of manufacture, a stair-carpet pad constructed of one or more layers of fibrous material, covered outside with sheets of paper, and strengthening material outside of and next to the paper, the whole being quilted through all the materials composing the pad, substantially as described.

2. The fibrous material *b* and sheets of paper *c* above and below the fibrous material, combined with a strengthening-layer next the paper to receive the stitches which unite the paper and fibrous material, to prevent the stitches cutting into the paper *c*, substantially as described.

GEO. W. CHIPMAN.

Witnesses:
G. W. GREGORY,
W. J. PRATT.